United States Patent [19]

Dochow et al.

[11] Patent Number: 4,560,987

[45] Date of Patent: Dec. 24, 1985

[54] RADAR TARGET DOPPLER FREQUENCY SCINTILLATION SIMULATOR AND METHOD

[75] Inventors: Claude Dochow; Mark L. Patterson; Richard W. Sanneman, all of Scottsdale, Ariz.

[73] Assignee: Motorola, Inc., Schaumburg, Ill.

[21] Appl. No.: 511,068

[22] Filed: Jul. 5, 1983

[51] Int. Cl.$^4$ .............................................. G01S 7/40
[52] U.S. Cl. ...................................... 343/17.7; 434/2
[58] Field of Search ........................... 343/17.7; 434/2

[56] References Cited

U.S. PATENT DOCUMENTS 3,731,309  5/1973  Meyer et al. ........................ 343/17.7
3,760,418  9/1973  Cash et al. ..................... 343/17.7 X
4,005,424  1/1977  Fetter ................................ 343/17.7

Primary Examiner—Salvatore Cangialosi
Assistant Examiner—Mark Hellner
Attorney, Agent, or Firm—Eugene A. Parsons

[57] ABSTRACT

Generating five Gaussian random variable, statistically identical but independent, signals, squaring four of the signals and combining two or four of the signals to provide the target power return, or radar cross section, of Swerling case one or three targets, respectively. Utilizing the fifth Gaussian random variable and dividing it by the square root of the target power return signal, and multiplying the result by the bandwidth of the fifth Gaussian random variable and a scale factor to provide an output signal representative of the target Doppler frequency scintillation.

12 Claims, 3 Drawing Figures

RADAR TARGET DOPPLER FREQUENCY SCINTILLATION SIMULATOR AND METHOD

BACKGROUND OF THE INVENTION

A radar target simulator is used in the laboratory or in an anechoic chamber in conjunction with a radar for testing the accuracy, susceptibility to glint, etc. A complex radar target such as an aircraft or ship at any instant of time appears as a collection of point reflectors located at the reflection centers of the various geometric shapes comprising the target. As the target rotates relative to the radar line-of-sight due to angular motion of the target or linear motion of the radar or target, the path lengths to the reflection centers and therefore, the phase shifts in the returns from the reflection centers vary. The multiple returns coherently add or subtract to produce amplitude peaks and fades in the total received signal and distortions in the phase front of the received signal at the radar antenna. The former effect is termed amplitude scintillation and the latter effect is termed angle scintillation or angle glint and also produces the scintillation in Doppler frequency. The present invention is designed to simulate Doppler frequency scintillation in a radar target.

A simulator which generated continuous time random noise representing the fluctuating power return or radar cross section of a Swerling case 1 or case 3 target type was previously developed by the assignee of this application. The previous simulator was incapable of generating target Doppler frequency scintillation. Whereas target amplitude scintillation is very important in the detection process, target Doppler frequency scintillation is of great importance in the Doppler tracking process since it produces target spectral spreading and dictates the bandwidth and other characteristics of the Doppler tracking loops in a coherent radar.

SUMMARY OF THE INVENTION

The present invention pertains to a radar target Doppler frequency scintillation simulator wherein a pseudo random signal is generated and commutated onto a plurality of output lines, filter means connected to each of the plurality of output lines provide a plurality of Gaussian random variable signals, which signals are squared and combined to produce an output signal representative of target power return, or amplitude scintillation. One Gaussian random variable signal is not squared but is divided by the square root of the target power return and multiplied by the bandwidth of the Gaussian random variable signal and a scale factor. The bandwidth is proportional to the target extent and target rotational rate relative to the radar. The scale factor is a fixed number that converts the output to a Doppler frequency. The final output signal is a radar target Doppler frequency scintillation signal.

It is an object of the present invention to provide new and improved radar target Doppler frequency scintillation simulating apparatus.

It is a further object of the present invention to provide a radar target simulator wherein the radar return signal is amplitude and frequency modulated to more closely represent a real target.

It is a further object of the present invention to provide a new and improved radar target Doppler frequency scintillation simulator for testing a large class of radar systems.

These and other objects of this invention will become apparent to those skilled in the art upon consideration of the accompanying specification, claims and drawings.

DESCRIPTION OF THE PREFERRED EMBODIMENT

Figure 1:
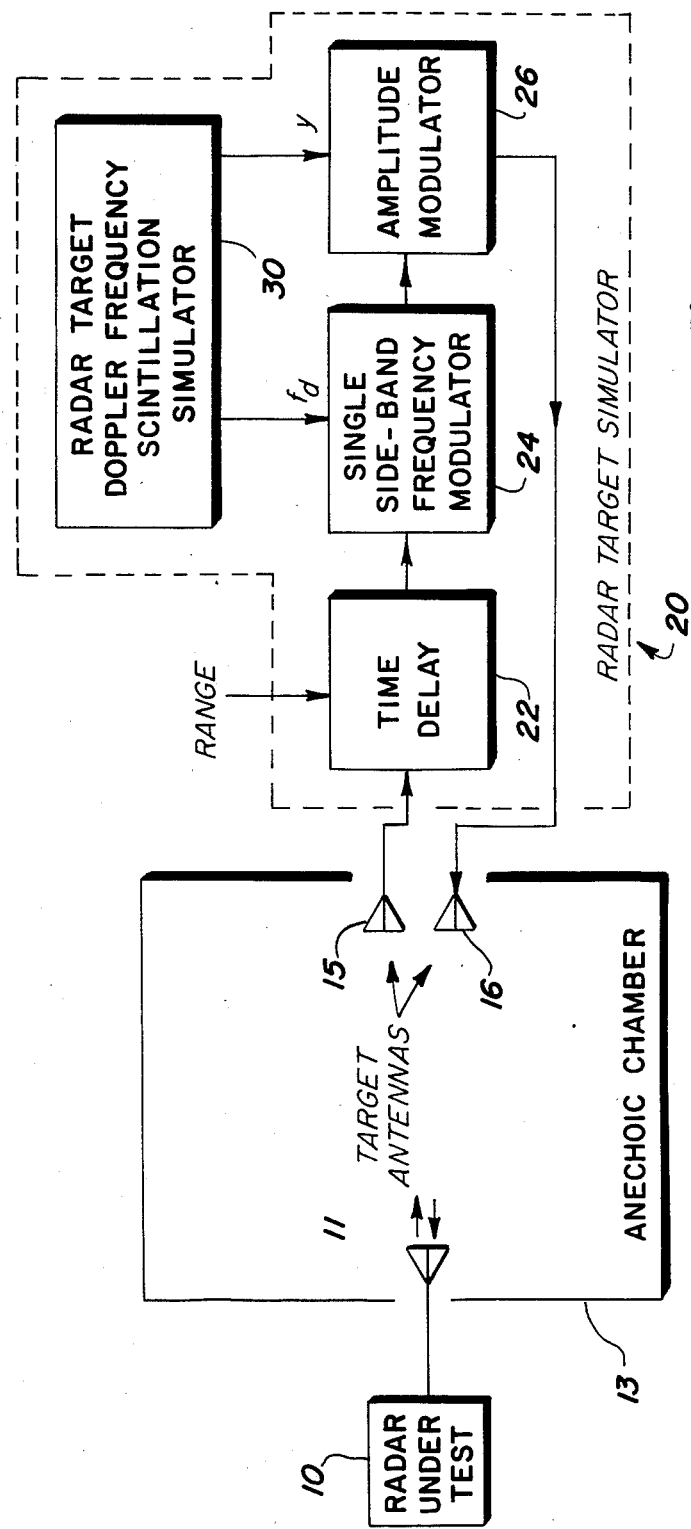
FIG. 1 is a block diagram of a radar test system including a simulator incorporating the present invention.

Referring specifically to FIG. 1, a radar 10 to be tested has an antenna 11 for transmitting pulses of energy and receiving responses reflected from targets, in the usual manner. The antenna 11 is positioned within an anechoic chamber 13. A pair of target antennas 15 and 16 are also positioned within the anechoic chamber 13 and designed for receiving signals from the antenna 11 and transmitting return signals thereto, respectively. The antennas 15 and 16 are connected to a radar target simulator, generally designated 20, embodying the present invention. The simulator 20 includes a time delay circuit 22, a single sideband frequency modulator 24, an amplitude modulator 26 and a radar target Doppler frequency scintillation simulator 30. The receiving antenna 15 is connected to the time delay circuit 22 to simulate a distance between the antenna 11 and the target antennas 15 and 16 and the time delay is variable, indicated by a range input, to provide for changes in the range. The output from the time delay 22 is supplied to the frequency modulator 24, which has an output supplied to the amplitude modulator 26. The output of the amplitude modulator 26 is supplied to the antenna 16 and is representative of a radar return signal from a simulated target. The scintillation simulator 30 supplies a signal, $f_d$, representative of target Doppler frequency scintillation to the frequency modulator 24 and a signal, y, representative of fluctuating target radar cross section or target power return to the amplitude modulator 26. The time delay 22, frequency modulator 24 and amplitude modulator 26 are state-of-the-art circuits and will not be described in detail herein. The target Doppler frequency scintillation simulator 30 is illustrated in a more detailed block form in FIG. 2.

Figure 2:
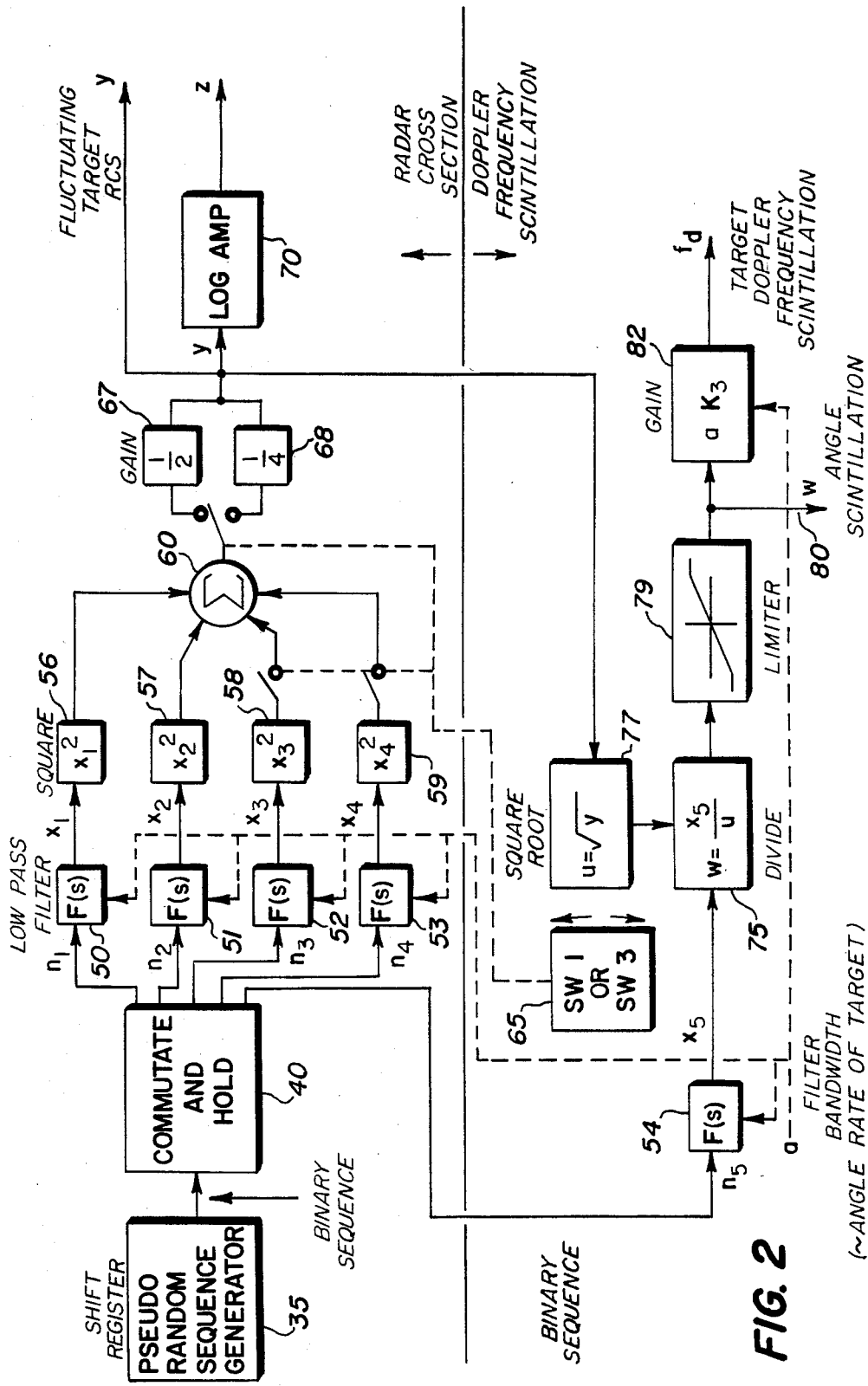
FIG. 2 is a simplified block diagram of the simulator of FIG. 1.
Figure 3:
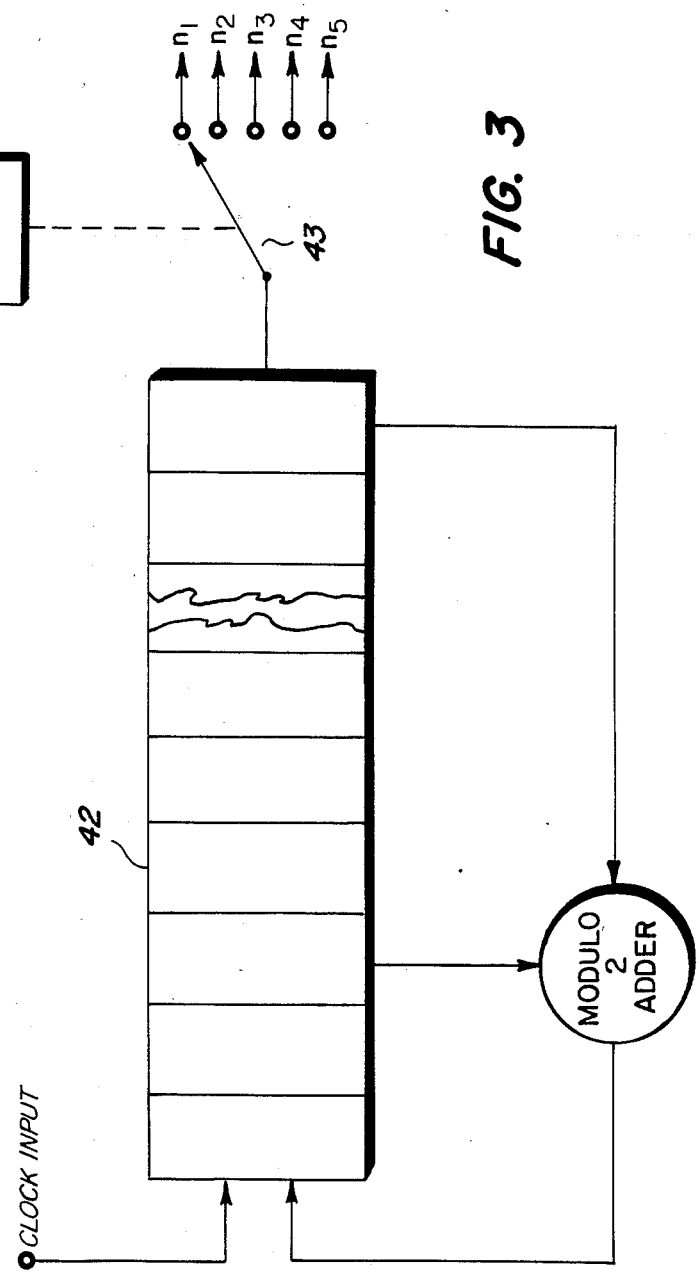
FIG. 3 is a more detailed block diagram of a portion of the simulator of FIG. 2.

Referring specifically to FIG. 2, a pseudo random sequence generator 35 provides a binary sequence to a commutate and hold circuit 40. The commutate and hold circuit 40 has a plurality of outputs, in this embodiment there are five outputs labeled $n_1$ through $n_5$. One possible embodiment of the random sequence generator 35 and commutate and hold circuit 40 is illustrated in FIG. 3. A typical shift register type of pseudo random noise generator (PN generator) 42 is clocked from a source of clock pulses and certain bits of the shift register are modulo 2 added and fed back to the first stage. Pseudo random noise pulses are shifted through the register 42 by pulses from the clock source and pulses in the final stage (most significant bit) of the shift register 42 are supplied to a moveable contact 43 of a switch 45. The switch 45 is also clocked by the clock input so that as each bit of data appears in the final stage of the shift register 42 it is switched to a different output, $n_1$ through $n_5$. It will be understood by those skilled in the art that the apparatus of FIG. 3 is one simplified embodiment for providing a random binary sequence and that many other systems might be devised by those skilled in the art.

The outputs $n_1$ through $n_5$ of the commutate and hold circuit 40 are supplied to low pass filters 50 through 54, respectively. Each of the filters 50 through 54 has a variable bandwidth, designated a. The filter bandwidth, a, is proportional equal to the angle rate of the target and to the target extent. The faster the simulated target rotates and the larger its extent, the higher the bandwidth, a, needs to be because the return signals are higher in frequency. The outputs of the low pass filters 50 through 54 are designated $x_1$ through $x_5$ each of which is a Gaussian random variable statistically identical to but independent of the other four Gaussian random variables. The bandwidth of the low pass filters 50 through 54 relative to the PN code rate should always be maintained low enough so that the noise passing therethrough is Gaussian. In the present example, the random variables $x_1$ through $x_5$ have a single sided three dB bandwidth which is selectable at values of 10, 25, 50, 100, 150 and 200 hertz. It will of course be understood by those skilled in the art that in many testing circumstances fixed low pass filters or time variable filters might be utilized and other low pass filters might simply be substituted rather than providing the low pass filters indicated.

The four Gaussian random variables $x_1$ through $x_4$ are supplied to squaring circuits 56 through 59. The outputs of the squaring circuits 56 and 57 are connected directly to a combining, or summing, circuit 60. The outputs of the squaring circuits 58 and 59 are connected to two contacts of a two-position switch 65. The two-position switch 65 disconnects the outputs of the squaring circuits 58 and 59 from the combining circuit 60 in a first position and connects the outputs to the combining circuit 60 in a second position. The combined outputs from the circuit 60 are connected to a third contact of the switch 65 which connects the combined outputs to one of two gain-adjusting circuits 67 or 68. The gain-adjusting circuit 67 reduces the gain by one-half when the outputs from the squaring circuits 58 and 59 are not supplied to the combining circuit 60 and reduces the gain by one-fourth when all of the outputs of the squaring circuits 56 through 59 are supplied to the combining circuit 60. The output of the gain-adjusting circuits 67 or 68 is the signal y representative of the fluctuating target radar cross section. When the switch 65 is in the first position or mode the signal y is a simulation of the scintillation associated with a Swerling case one type of target and when the switch 65 is in the second position the signal y is a simulation of the scintillation associated with a Swerling case three type of target. The output signal y of the simulator is a random voltage proportional to the logarithm of the radar cross section and is supplied to the amplitude modulator 26 to amplitude modulate the output signal of the radar target simulator 20. A linear version of the radar cross section is also furnished by supplying the signal y through a logarithmic amplifier 70.

To produce the angle and Doppler frequency scintillation signals the output $x_5$ of the low pass filter 54 is supplied as the divisor to a dividing circuit 75. The radar cross section signal y is supplied to a circuit 77 which develops the square root of the signal y and supplies it to the dividing circuit 75 as the dividend. The quotient or output signal from the dividing circuit 75 is supplied through a limiter 79 to an output 80. The limiter bounds the amplitude of the signal when the divident is near or equal to zero. The signal w at the output 80 is representative of the target angular scintillation. The output signal from the limiter 79 is also supplied to a gain circuit 82 along with the bandwidth, a, of the low pass filters 50 through 54. The gain circuit 82 multiplies the angle scintillation signal w by the bandwidth and by a scale factor $k_3$. Since the filter bandwidth is proportional to the angle rate of the target, multiplying the angle scintillation signal by the bandwidth is generally equivalent to multiplying the angle scintillation by the rotation rate of the target relative to the radar. The target Doppler frequency scintillation signal $f_d$ is supplied to the frequency modulator 24 as illustrated in FIG. 1.

Thus, new and improved radar target simulating apparatus is disclosed which allows Doppler frequency scintillation to be simulated with much simpler equipment and at a much lower cost than using multiple reflector target models as has been done in the past. Further, the disclosed apparatus can be implemented in either analog or digital circuits and, if implemented in digital circuits can be incorporated into relatively small and inexpensive IC chips.

While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

We claim:

1. A radar target simulator comprising:
    first means for generating a pseudo random signal and commutating the signal onto a plurality of output lines;
    filter means connected to each of the plurality of output lines for providing a plurality of Gaussian random variable signals one from each of the signals on each of the plurality of output lines;
    second means connected to said filter means for squaring all but one of the plurality of Gaussian random variable signals and combining the squared signals to provide an output signal representative of target power return;
    third means connected to said filter means to receive the one unsquared Gaussian random variable signal and connected to said second means to receive the output signal for determining the square root of the received output signal and dividing the received Gaussian random variable signal by the square root to produce an output signal representative of target angle scintillation.

2. A radar target simulator as claimed in claim 1 including in addition fourth means coupled to receive the output signal from the third means for scaling the output signal to provide an output signal representative of target Doppler frequency scintillation.

3. A radar target simulator as claimed in claim 2 wherein the one unsquared Gaussian random variable signal has a predetermined bandwidth and the fourth means includes multiplier means for multiplying the target angle scintillation signal by the predetermined bandwidth and by a scale factor.

4. A radar target simulator as claimed in claim 1 wherein the first means includes a pseudo random binary sequence generator.

5. A radar target simulator as claimed in claim 4 wherein the sequence generator includes a multi-bit shift register with the most significant bit being connected to each of the plurality of outputs in turn by a clocked switch, clocked at the bit rate.

6. A radar target simulator as claimed in claim 1 wherein the filter means includes a plurality of low pass filters each having a variable bandwidth, one each connected to each of the plurality of output lines of the first means.

7. A radar target simulator as claimed in claim 6 wherein each of the low pass filters has a single sided 3 dB bandwidth selectable at values ranging between approximately 10 and 200 Hz.

8. A radar target simulator as claimed in claim 1 wherein there are 5 output lines from the first means and 5 Gaussian random variable signals from the filter means and the second means includes switching means for combining the squared signals of 2 Gaussian random variable signals to produce an output signal representative of a Swerling case 1 target in a first mode of operation and for combining the squared signals of 4 Gaussian random variable signals to produce an output signal representative of a Swerling case 3 target in a second mode of operation.

9. In a radar target simulator of the type which produces a simulation signal representative of the target power return, or radar cross section, a radar target Doppler frequency scintillation simulator comprising:
 first means for obtaining the square root of the simulation signal;
 second means for providing a Gaussian random variable signal having a predetermined bandwidth;
 a divider coupled to said first and second means for dividing the Gaussian random variable signal by the square root of the simulation signal; and
 a multiplier coupled to said divider for multiplying the output thereof by the predetermined bandwidth and by a scale factor determined by the dimensions of the target to be simulated to provide an output signal representative of the target Doppler frequency scintillation.

10. A radar target Doppler frequency scintillation simulator as claimed in claim 9 wherein the second means includes a pseudo random binary sequence generator, a low pass filter having the predetermined bandwidth and commutating means connecting a portion of the binary sequence from the generator to the low pass filter, the Gaussian random variable signal being available at the output of the low pass filter.

11. A method of simulating radar target Doppler frequency scintillation comprising the steps of:
 providing a Gaussian random variable signal having a predetermined bandwidth;
 providing a simulation signal representative of the target power return, or radar cross section;
 obtaining the square root of the simulation signal;
 dividing the Gaussian random variable signal by the square root of the simulation signal; and
 multiplying the results obtained in the dividing step by the predetermined bandwidth and by a scale factor.

12. A method as claimed in claim 11 including in addition the steps of amplitude modulating a radar return signal with the signal representative of the target power return, frequency modulating the radar return signal with the simulated radar target Doppler frequency scintillation, and communicating the modulated radar return signal to a radar to be tested.

* * * * *